Oct. 24, 1944.                W. F. BOLDT                2,360,843
                             BRAKING SYSTEM
                          Filed May 1, 1942            3 Sheets-Sheet 1
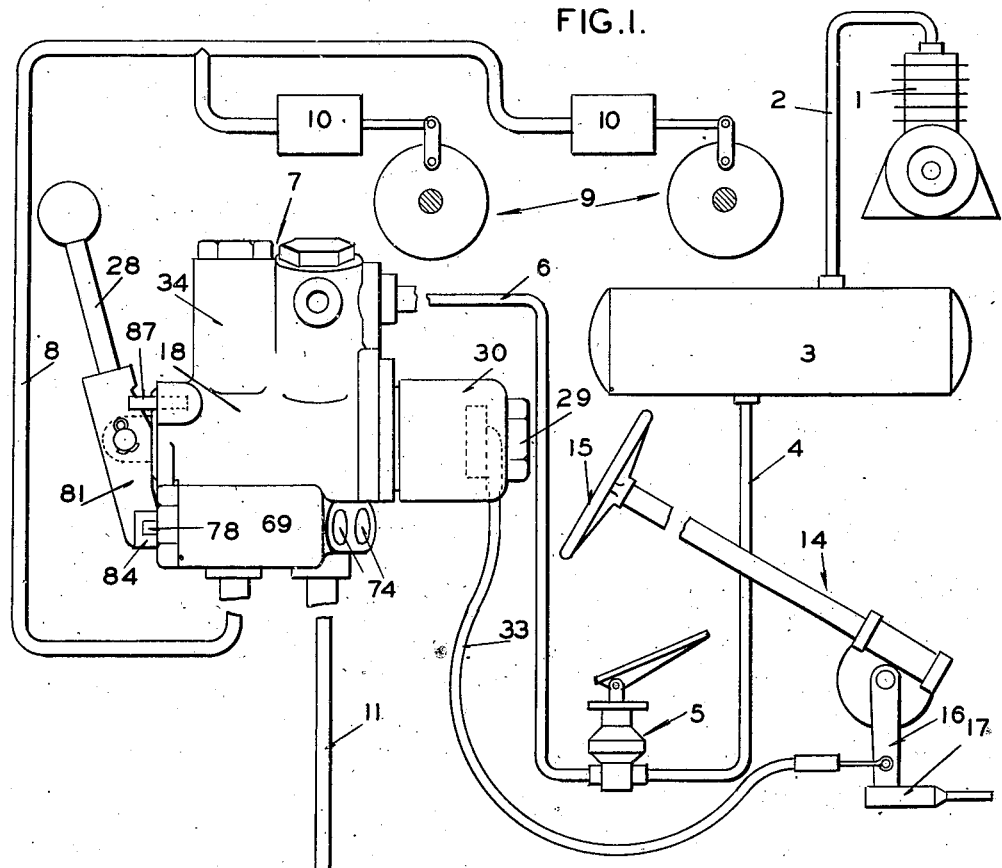
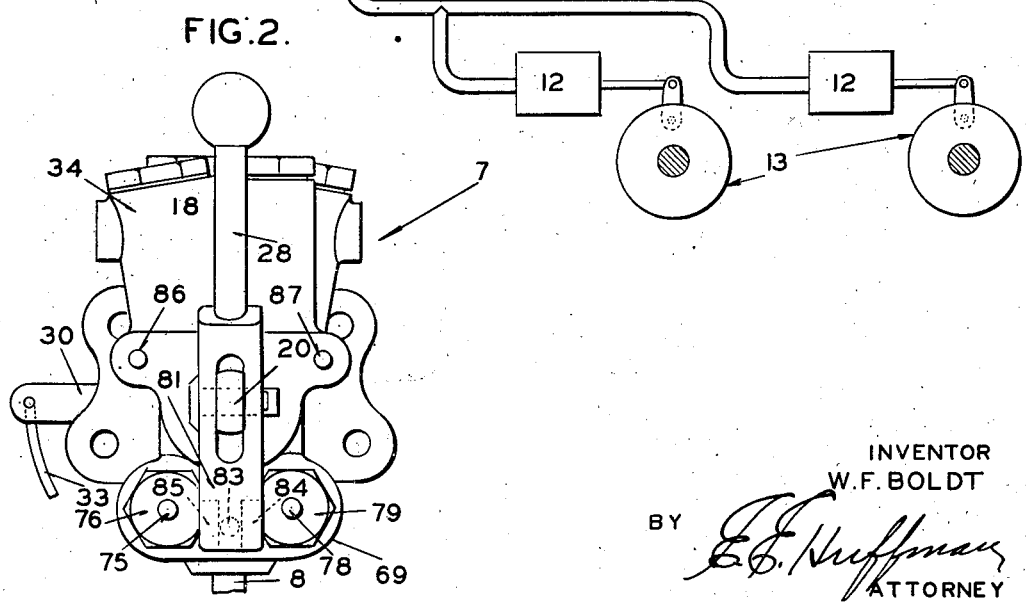
INVENTOR
W. F. BOLDT
BY
ATTORNEY

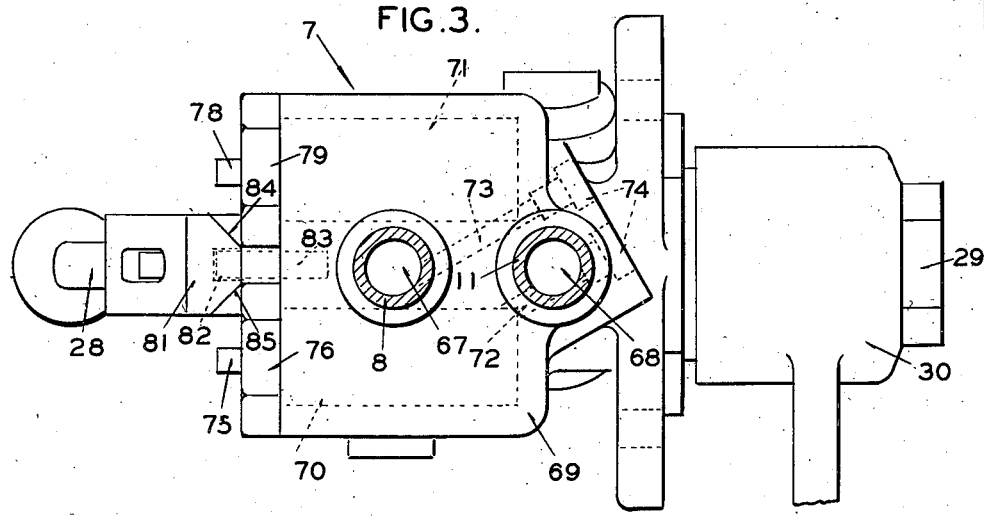
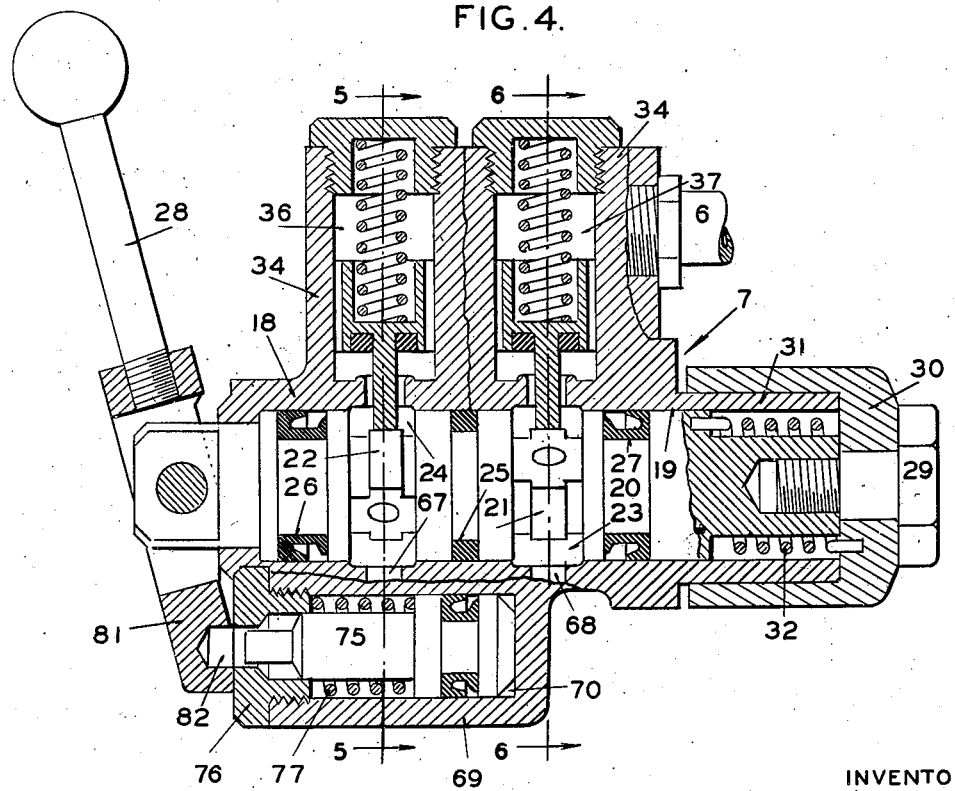

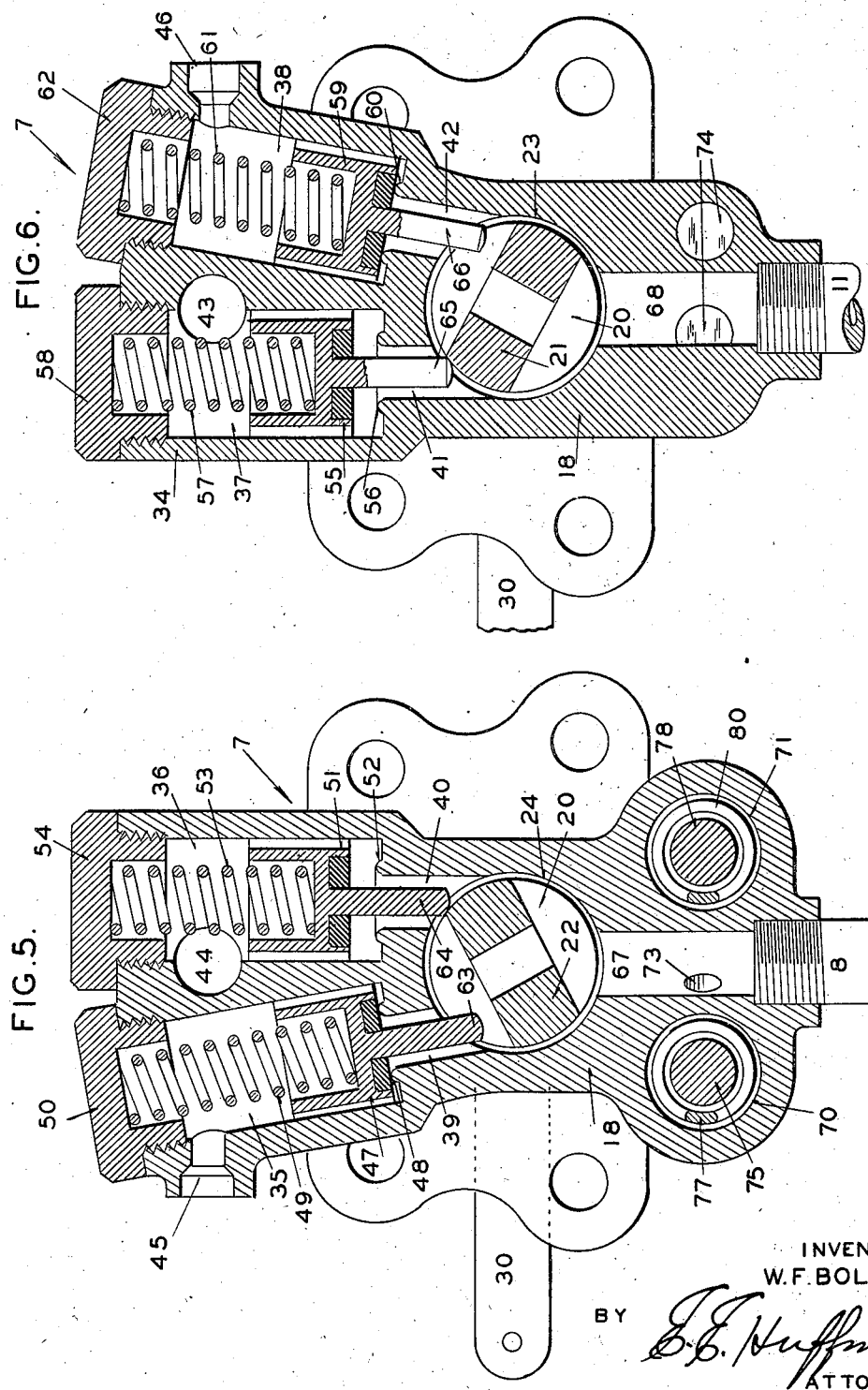

Patented Oct. 24, 1944

2,360,843

UNITED STATES PATENT OFFICE 2,360,843

BRAKING SYSTEM

Werner F. Boldt, Clayton, Mo., assignor to Wagner Electric Corporation, St. Louis, Mo., a corporation of Delaware Application May 1, 1942, Serial No. 441,255

18 Claims. (180—18)

My invention relates to a braking system and more particularly to one which can be employed to aid in steering a vehicle.

One of the objects of my invention is to produce an improved fluid pressure braking system for a vehicle which will enable the operator to efficiently operate it under all conditions.

Another and more specific object of my invention is to provide an improved fluid pressure actuated braking system for a vehicle which can be so automatically controlled by the steering mechanism that the braking system can be employed to brake certain vehicle driving members only and thus aid in accomplishing short turning of the vehicle.

Still another object is to embody in a braking system of the type referred to, manual means for controlling the selection of certain brakes to be applied notwithstanding the condition of the steering mechanism.

Yet another object of my invention is to produce an improved valve means for a fluid pressure braking system which can be controlled either by the steering mechanism of a vehicle or by independently operated manual means.

Other objects of my invention will become apparent from the following description taken in connection with the accompanying drawings in which Figure 1 is a schematic view of a braking system embodying my invention; Figure 2 is an end view of my improved control valve mechanism; Figure 3 is a bottom view of said valve mechanism; Figure 4 is a sectional view taken on a broken line and showing the internal construction of said valve mechanism; and Figures 5 and 6 are sectional views taken on the lines 5—5 and 6—6 respectively, of Figure 4.

Referring first to Figure 1, I have shown my improved braking system as being of the type in which air under pressure is employed as the actuating fluid medium but it is to be understood that other fluid may be used. As shown, the source of air pressure comprises a compressor 1 which is connected by a conduit 2 to a storage tank 3. The outlet of the storage tank is connected by a conduit 4 to a foot-operated control valve 5 which controls the flow of air under pressure through the conduit 6 to my improved control valve mechanism generally indicated by the numeral 7. A conduit 8 leads from control valve 7 to the brakes 9 associated with the left side driving members of the vehicle, said brakes being actuated by power cylinders 10. Also leading from the control valve mechanism 7 is a second conduit 11 which is connected to the power cylinders 12 for actuating the brakes 13 associated with the driving members on the right side of the vehicle. A steering column 14 for steering the vehicle by means of the usual steering wheel 15 is also shown in Figure 1. This steering wheel actuates the steering arm 16 back and forth from its central position shown in the figure and by means of the drag link 17 turns the dirigible wheels (not shown) of the vehicle.

Referring now to details of the control valve mechanism 7 which is variously shown in Figures 2 to 6 said valve mechanism is embodied in a casing 18 in which is provided a horizontal bore 19. Rotatably mounted within this bore is a shaft 20 carrying two cams 21 and 22 positioned in chambers 23 and 24, respectively. A packing member 25 carried by the shaft, seals one chamber from the other and other packing elements 26 and 27 seal the outer ends of the chambers. The forward end of shaft 20 projects to the exterior of the casing and pivotally mounted on this end of the shaft is a hand lever 28. The rear end of the shaft has pivotally mounted thereon, by means of a bolt 29, an arm 30 provided with a cup-shaped hub receiving bearing support on a cylindrical extension 31 of the casing. The arm 30 is connected to the shaft by a coil spring 32, which spring is of sufficient strength that arm 30 can rotate the shaft if the shaft is not positively held stationary. The spring, however, will yield and permit relative rotation between the shaft and the arm in the event either the shaft or the arm is held from rotation while the other member is rotated. The arm 30 is connected by a Bowden wire 33 to the arm 16 of the steering mechanism. It is seen that by means of this Bowden wire when arm 16 is rotated in a clockwise direction (right turning of the vehicle wheels) from its position as viewed in Figure 1, arm 30 will be moved upwardly and when rotated in a counter-clockwise direction (left turning of the vehicle wheels) from said position as shown in Figure 1, arm 30 will be moved downwardly.

The main body of casing 18 has an upwardly extending portion 34 in which is provided four bores 35, 36, 37, and 38, all of which have their axes at right angles to the axis of the shaft. Bores 35 and 36 are positioned at the forward end of the casing and are connected to chamber 24 by passages 39 and 40. The bores 37 and 38 are positioned rearwardly of bores 35 and 36 and are connected to chamber 23 by passages 41 and 42. As best shown in Figure 6, bore 37 is provided with an inlet port 43 to which is connected conduit 6 leading from the foot-operated valve 5. Bore 37 is also in communication with the forward bore 36 by way of a passage 44 (see Figure 5). The inlet port 43 and passage 44 are made by a single drilled hole. It is seen that whenever the foot-operated valve is opened, air under pressure can enter both bores 37 and 36. A port 45 connects bore 35 to atmosphere and a port 46 connects bore 38 to atmosphere.

Passage 39 between bore 35 and chamber 34 is controlled by a valve element 47 which is biased toward its seat 48 by a spring 49 interposed between the valve element and a closure plug 50 for the upper end of the bore. Passage 40 between bore 36 and chamber 24 is controlled by a valve element 51 which is biased toward its seat 52 by a spring 53 interposed between the valve element and a closure plug 54 for the upper end of the bore. Passage 41 between bore 37 and chamber 23 is controlled by a valve element 55 which is biased toward its seat 56 by a spring 57 interposed between the valve element and a closure plug 58 for the upper end of the bore. Passage 42 between bore 38 and chamber 23 is controlled by a valve element 59 which is biased toward its seat 60 by a spring 61 interposed between the valve element and a closure plug 62 for the upper end of the bore. The valve elements 47 and 51 have stems 63 and 64, respectively, which project into the chamber 24 for cooperation with cam 22. Similarly, the valve elements 55 and 59 have stems 65 and 66, respectively, which project into chamber 23 for cooperation with cam 21. The cams 21 and 22 are so arranged on the shaft that when the hand lever 28 is in its vertical position, the cams will be positioned as shown in Figures 4, 5, and 6. Under these conditions the valve elements 51 and 55 will be held open and valve elements 47 and 59 will be permitted to be closed by the action of their springs. It is thus seen that fluid under pressure can enter the chambers 23 and 24 if the foot-operated valve 5 is opened and the chambers cannot communicate with the atmosphere since the valves 51 and 59 are closed. Chamber 24 is connected by a passage 67 to conduit 8 leading to the left hand power cylinders 10 and chamber 23 is connected by a passage 68 to conduit 11 leading to the right hand power cylinders 12. Thus when fluid under pressure is present in chamber 24, the left brakes will be applied and when fluid under pressure is present in chamber 23, the right brakes can be applied. With the valve elements in the positions shown in Figures 5 and 6, both brakes will be capable of being applied by opening the foot-operated valve.

The main body of the casing is also provided with an integral portion 69 on the lower side thereof and this portion is provided with spaced parallel bores 70 and 71 which are also parallel with the axis of bore 19 and shaft 20. The bore 70 communicates with passage 68 by a drilled passage 72 and bore 71 communicates with passage 67 by a drilled passage 73. The open ends of these drilled passages are closed by plugs 74. Within bore 70 is a plunger 75 having a portion which is capable of extending to the exterior of the bore through the closure plug 76 when the plunger is actuated. A spring 77 normally biases this plunger inwardly. Within bore 71 is a similar plunger 78 which has a portion capable of extending through the closure plug 79 when the plunger is actuated. A spring 80 also normally biases this second plunger inwardly. The purpose of plungers 75 and 79 is to lock the hand lever 28 and shaft 20 in certain positions. In order to accomplish this, the lower arm 81 of the hand lever is provided with a hole 82 for receiving the ends of the plungers when they are pushed to the exterior of the plugs. This hole 82 is also adapted to receive a pin 83 which is positioned between the bores where the lever will be in its vertical central position. The arm 81 of the lever has cam surfaces 84 and 85 (see Figure 3). On the forward side of casing 18 there is provided stops 86 and 87 to limit the extent of movement of lever 28 in either direction from its central vertical position.

Referring now to the operation of the braking system just described, the normal positions of the valve parts will be as shown in the various figures, such normal positions being under conditions wherein the hand lever 28 is in its central vertical position and pulled rearwardly and locked by pin 83 being received in hole 82. It is to be noted that when the lever and the shaft are in these positions, the valve elements permit free communication between conduit 6 and both conduits 8 and 11 leading to the power cylinders of all the brakes. Thus if the foot-operated valve 5 is actuated, all the brakes on both sides of the vehicle can be applied and released. Regardless of the turning position of the steering wheel, shaft 20 will not be rotated and, therefore, the position of the valve elements, as shown in Figures 5 and 6, will not be altered. Arm 30, however, can pivot on the end of shaft 20 when the steering mechanism is moved since this is permitted by coil spring 32.

If it should be desired to control the valve by the steering mechanism so as to use the brakes to aid in steering, then handle 28 is moved forwardly in order to unlock it from pin 83. This will unlock shaft 20 and, therefore, whenever the steering mechanism is moved, shaft 20 will be moved also. If the steering mechanism should be moved to the right and to a position where the dirigible wheels are turned beyond about seventy-five per cent of their total turning angle, then arm 30 will be so moved in a clockwise direction, as viewed in Figures 5 and 6, that the valve element 51 becomes closed and valve element 47 becomes open. The positions of the valve elements 55 and 59, however, will remain as shown in Figure 6 since cam 21 will continue to hold the valve element 55 open and will move farther away from stem 66 of valve element 59. Under these conditions conduit 11 will still be in connection with conduit 6 but conduit 8 will be cut off from said conduit 6. Thus when the foot-operated valve 5 is opened, fluid under pressure can flow only to the power cylinders 12 and actuate the brakes 13 on the right side of the vehicle. The application of the brakes will tend to hold the driving members on the right side. Free movement of the driving members on the left side is permitted. Thus the braking effect on the vehicle will be such as to tend to cause the vehicle to pivot about the driving members on the right side of the vehicle.

If the steering mechanism should be turned so as to turn the dirigible wheels shortly to the left, then arm 30 will be moved in a counterclockwise direction, as viewed in Figures 5 and 6, and shaft 20 so rotated that cam 21 will cause the valve element 55 to be closed and valve element 59 to be open but without disturbing the positions of valves 47 and 51 as shown in Figure 5. Thus conduit 6 will only be capable of communicating with conduit 8 and, therefore, if the foot-operated valve is opened, only the left hand brakes will be applied, thus aiding in steering in the same manner as described in connection with short right hand turning.

The arrangement of the cams is such that simultaneous braking on all wheels will not be effected unless the steering mechanism is turned in either direction from straight ahead position an angle corresponding to seventy-five to eighty per cent of the total steering range on either side.

It is to be noted that whenever air under pressure is conveyed to the right hand brake operating power cylinders 12, plunger 76 will be pushed outwardly and whenever fluid under pressure is being conveyed to the left end power cylinders, plunger 78 will be pushed outwardly. Movement of these plungers outwardly will not, however, lock the hand lever 28 since such lever is pivoted forwardly from the position shown in the various figures. If it should be desired to lock hand lever 28 in either of its extreme right or left hand rotated positions, such may be done by merely pulling back the lever. Thus if it is desired to keep only the right hand brakes applied, the hand lever, if not already in its extreme position where it abuts the stop 87, can be placed there and then pulled rearwardly. This will cause the end of plunger 75 to be received in hole 82 in the lower arm of the lever and maintain shaft 20 locked. This frees the operator's hand from holding lever 28 and he can use it for some other purpose. As long as the foot-operated valve 5 continues to be held open and the brakes applied, the lever will continue to be locked and only the right brakes will continue to be held applied regardless of the fact that the steering mechanism may be turned to a straight ahead position or to the left as spring 32 will yield and permit arm 30 to be turned relatively to shaft 20. When the foot-operated valve 5 is actuated to release the brakes, hand lever 28 will be automatically unlocked since air under pressure will be released from ahead of plunger 75 and spring 77 will pull in the plunger. The hand lever and shaft 20 will then assume a condition corresponding to that determined by the steering mechanism.

It is thus seen from this arrangement that the operator can control the brakes as he desires regardless of the position of the steering mechanism. Thus if the wheels should be turned in one direction and conditions are such that it is desirable to have the brakes applied on the side of the vehicle away from the direction of turning, then such can be done by manual manipulation of the lever. The lever can also be locked in this position. Whenever the brakes are released, the hand lever will be automatically released and the valve will assume its position as determined by the position of the steering mechanism. The cams 84 and 85 on arm 82 of the hand lever are so arranged that when the hand lever is released by the inward movement of a locking plunger, the hand lever will be automatically pushed forwardly as it returns to a position determined by the steering mechanism. Thus if the wheels should be turned to the right and the hand lever is so manipulated and locked that the brakes are applied on the left side of the vehicle, then when the brakes are released, the handle will be swung all the way over against stop 87. Pin 83 will not interfere with this swinging movement of the lever due to cam 85 contacting the pin and swinging the lever inwardly so that it can pass pin 83.

It is also to be noted in connection with the control valve mechanism that if the brakes on both sides of the vehicle should be applied when a short turn is being made, say for example, to the right, then the brakes on the left will be automatically released and it will not be necessary to release the brakes and then re-apply them to obtain the application of the brakes on the right side of the vehicle only. Release of the brakes on the left side of the vehicle will be accomplished by the opening of the valve element 47 in order to place the power cylinders 10 in communication with the atmosphere through port 46. The valve element 59 functions in a similar manner to release the right hand brakes when the vehicle is turned to the left at a time when all the brakes are applied.

From the foregoing it is obvious that I have produced such a braking system that it can be very efficiently used in aiding in the steering of the vehicle. If it is not desired to use the valve mechanism in any way to control the brakes, it may be locked out by merely pulling hand lever 28 rearwardly when it is in its vertical position. If it is desired to have the valve mechanism automatically controlled by the steering mechanism, then it is only necessary to move hand lever 28 forwardly in order to unlock the lever and shaft 20. If it is desired to change the condition of the steering mechanism control, this can be done by merely manipulating the hand lever to a desired position, thus over-riding the control condition determined by the position of the steering mechanism. The valve arrangement is also such that the hand lever can be locked in either position where only the brakes on one side of the vehicle are being applied and the position of the steering mechanism will have no effect thereon. However, when the brakes are released, the valve mechanism will be again automatically controlled by the position of the steering mechanism.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, means for controlling said last named means at will, means for locking said last named means in either position where a motor is cut off, and means for automatically releasing the locking means when fluid pressure is released from the operated motor.

2. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, means for controlling said last named means at will, and means for locking said last named means in either position where a motor is cut off, said locking means being caused to be operative only when fluid pressure is effective in the motor which is not cut off from the pressure source.

3. In a vehicle provided with a dirigible wheel, steering mechanism therefor and with driving members on opposite sides of the vehicle, a fluid pressure actuated braking system for the driving members comprising a source of pressure in communication with a brake actuating device on each member, valve means for shutting off communication between the source and one brake actuating device, valve means for shutting off communication between the source and the other brake actuating device, a rotatable shaft and cams connected to operate both valve means and having one shaft position where both valve means are inoperative to shut off said communications and positions obtained by rotation of the shaft in opposite directions therefrom where the valve means can be selectively made operative by the cams, and a connection between the steering mechanism and the shaft whereby it can be controlled by said steering mechanism.

4. In a vehicle provided with a dirigible wheel, steering mechanism therefor and with driving members on opposite sides of the vehicle, a fluid pressure actuated braking system for the driving members comprising a source of pressure in communication with a brake actuating device on each member, valve means for shutting off communication between the source and one brake actuating device, valve means for shutting off communication between the source and the other brake actuating device, a movable member connected to operate both valve means and having one position where both valve means are inoperative to shut off said communications and positions on opposite sides thereof where the valve means can be selectively made operative, a connection between the steering mechanism and the movable member whereby it can be controlled by said steering mechanism, and means comprising manually-controlled means for holding the movable member in a fixed position and preventing it from being controlled by the steering mechanism notwithstanding the movement of said steering mechanism.

5. In a vehicle provided with a dirigible wheel, steering mechanism therefor and with driving members on opposite sides of the vehicle, a fluid pressure actuated braking system for the driving members comprising a source of pressure in communication with a brake actuating device on each member, valve means for shutting off communication between the source and one brake actuating device, valve means for shutting off communication between the source and the other brake actuating device, a movable member connected to operate both valve means and having one position where both valve means are inoperative to shut off said communications and positions on opposite sides thereof where the valve means can be selectively made operative, a connection between the steering mechanism and the movable member, yieldable means in said connection permitting the steering mechanism to be moved independently of the member or the member to be moved independently of the steering mechanism, operator-operated means for moving the movable member at will without regard to the condition of the steering mechanism, and means for locking the movable member in either the inoperative position of both valve means or in their selected operative positions and thereby prevent any movement of the movable member by the steering mechanism when moved.

6. In a vehicle provided with a dirigible wheel, steering mechanism therefor and with driving members on opposite sides of the vehicle, a fluid pressure actuated braking system for the driving members comprising a source of pressure in communication with a brake actuating device on each member, valve means for shutting off communication between the source and one brake actuating device, valve means for shutting off communication between the source and the other brake actuating device, a movable member connected to operate both valve means and having one position where both valve means are inoperative to shut off said communications and positions on opposite sides thereof where the valve means can be selectively made operative, a connection between the steering mechanism and the movable member, yieldable means in said connection permitting the steering mechanism to be moved independently of the member or the member to be moved independently of the steering mechanism, operator-operated means for moving the movable member at will without regard to the condition of the steering mechanism, means for locking the movable member in either of its positions where the valve means are operative, and means for automatically releasing the locking means when the fluid pressure is released from an operated brake actuating device.

7. In a vehicle provided with a dirigible wheel, steering mechanism therefor and with driving members on opposite sides of the vehicle, a fluid pressure actuated braking system for the driving members comprising a source of pressure in communication with a brake actuating device on each member, valve means for shutting off communication between the source and one brake actuating device, valve means for shutting off communication between the source and the other brake actuating device, a movable member connected to operate both valve means and having one position where both valve means are inoperative to shut off said communications and positions on opposite sides thereof where the valve means can be selectively made operative, a connection between the steering mechanism and the movable member, yieldable means in said connection permitting the steering mechanism to be moved independently of the member or the member to be moved independently of the steering mechanism, operator-operated means for moving the movable member at will without regard to the condition of the steering mechanism, and fluid pressure actuated means for locking the movable member in either of its positions where the valve means are operative but only if fluid pressure is transmitted from the source to a brake actuating device.

8. In a fluid pressure control system for a vehicle having a driven member on each side thereof, a brake associated with each member and a vehicle steering mechanism, a fluid motor for applying each brake, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, means for controlling the selective means by the steering mechanism, means for controlling said selective means at will regardless of the condition of the steering mechanism, and means for locking said selective means in either position where a motor is cut off and thereby prevent any control by the steering mechanism when moved.

9. In a fluid pressure control system for a vehicle having a driven member on each side thereof, a brake associated with each member and a vehicle steering mechanism, a fluid motor for applying each brake, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, means for controlling the selective means by the steering mechanism, means for controlling said selective means at will regardless of the condition of the steering mechanism, means for locking said selective means in either position where a motor is cut off, and means for automatically restoring the selective means to the control of the steering mechanism when the pressure is released by the main valve.

10. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valve in open position and the other valves in closed position, means for selectively moving said member in opposite directions from said normal position, said member when moved in one direction rendering the cut-off valve of one fluid motor closed and the other valve of said motor open and when moved in the opposite direction rendering the cut-off valve of the other motor closed and said other valve of said motor open, and manually-controlled means for locking said member in its normal central position.

11. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, means for selectively moving said member in opposite directions from said normal position, said member when moved in one direction rendering the cut-off valve of one fluid motor closed and the other valve of said motor open and when moved in the opposite direction rendering the cut-off valve of the other motor closed and said other valve of said motor open, and means for locking said member in its positions where a cut-off valve is closed.

12. In a fluid pressure control system for a vehicle having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, means for selectively moving said member in opposite directions from said normal position, said member when moved in one direction rendering the cut-off valve of one fluid motor closed and the other valve of said motor open and when moved in the opposite direction rendering the cut-off valve of the other motor closed and said other valve of said motor open, and fluid pressure controlled means for locking said member in its positions where a cut-off valve is closed but only when fluid pressure is being transmitted through the open valve.

13. In a fluid pressure control system for a vehicle provided with a steering mechanism and having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, and means for moving said member in opposite directions from said normal position by the steering mechanism, said member when moved in one direction rendering the cut-off valve of one fluid motor closed and the other valve of said motor open and when moved in the opposite direction rendering the cut-off valve of the other motor closed and said other valve of said motor open.

14. In a fluid pressure control system for a vehicle provided with a steering mechanism and having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cutoff valves in open position and the other valves in closed position, means for moving said member in opposite directions from said normal position by the steering mechanism, said member when moved in one direction rendering the cut-off valve of one fluid motor closed and the other valve of said motor open and when moved in the opposite direction rendering the cut-off valve of the other motor closed and said other valve of said motor open, and means including manual means for moving said member at will regardless of the condition of the steering mechanism.

15. In a fluid pressure control system for a vehicle provided with a steering mechanism and having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, means for moving said member in opposite directions from said normal position by the steering mechanism, said member when moved in one direction rendering the cut-off valve of one fluid motor closed and the other valve of said motor open and when moved in the opposite direction rendering the cut-off valve of the other motor closed and said other valve of said motor open, and means for locking said member in either of its positions where a cut-off valve is closed but only when fluid pressure is being transmitted to the fluid motor not cut off from the source.

16. In a fluid pressure control system for a vehicle provided with a steering mechanism and having a driven member on each side thereof and a brake associated with each member, a fluid motor for applying each brake, a source of fluid pressure different from atmosphere, conduit means between the source of fluid pressure and each fluid motor, valve means for placing the source of fluid pressure in communication with the motors through the conduit means, a valve for cutting off communication between the source of fluid pressure and each of the fluid motors, a valve for placing each fluid motor in communication with a body of fluid at atmospheric pressure, a single member for controlling said four last named valves and normally maintaining said cut-off valves in open position and the other valves in closed position, means for moving said member in opposite directions from said normal position by the steering mechanism, said member when moved in one direction rendering the cut-off valve of one fluid motor closed and the other valve of said motor open and when moved in the opposite direction rendering the cut-off valve of the other motor closed and said other valve of said motor open, and means operable at will for preventing the member from being controlled by the steering mechanism.

17. In a fluid pressure control system for operating two devices, a fluid motor for actuating each device, a source of fluid pressure different from atmosphere, conduit means between the source of fluid pressure and each fluid motor, means for causing fluid pressure from the source to be effective in the motors through the conduit means, means for selectively causing either of the fluid motors to be cut off from communication with the source of fluid pressure and placed in communication with a body of fluid at atmospheric pressure, said means comprising a shut-off valve for preventing fluid from flowing to each motor and a relief valve for connecting each motor to the body of fluid at atmospheric pressure, a rotatable shaft having cams for controlling the four valves, said shaft having one shaft position where the cams cause both shut-off valves to be open and the relief valves are permitted to be closed, a second position obtained by rotation of the shaft in one direction from said one position for permitting the shut-off valve of one motor to be closed and the relief valve for said motor to be opened, and a third position obtained by rotation of the shaft in the other direction from said one position for permitting the shut-off valve of the other motor to be closed and the relief valve for said other motor to be opened, and means for rotating the shaft at will to the different positions.

18. In a fluid pressure control system for operating two devices, a fluid motor for actuating each device, a source of fluid pressure different from atmosphere, conduit means between the source of fluid pressure and each fluid motor, a main valve for placing the source of fluid pressure in communication with the motors through the conduit means, means for selectively causing either of the fluid motors to be cut off from communication with the source of fluid pressure and placed in communication with a body of fluid at atmospheric pressure, said means comprising a shut-off valve for preventing fluid from flowing to each motor and a relief valve for connecting each motor to the body of fluid at atmospheric pressure, a rotatable shaft having cams for controlling the four valves, said shaft having one shaft position where the cams cause both shut-off valves to be open and the relief valves are permitted to be closed, a second position obtained by rotation of the shaft in one direction from said one position for permitting the shut-off valve of one motor to be closed and the relief valve for said motor to be opened, and a third position obtained by rotation of the shaft in the other direction from said one position for permitting the shut-off valve of the other motor to be closed and the relief valve for said other motor to be opened, means for rotating the shaft at will to the different positions, means for locking the shaft in the second and third positions, and means for automatically releasing the locking means when fluid pressure is released by the main valve.

WERNER F. BOLDT.